Patented Aug. 16, 1938

2,127,291

UNITED STATES PATENT OFFICE 2,127,291

LIQUID HOMOGENIZING APPARATUS

John H. Gardner and Le Forrest C. Plastridge, La Porte, Ind., assignors to Gardner Dairy Equipment Corporation, La Porte, Ind., a corporation of Michigan Application November 14, 1936, Serial No. 110,899

5 Claims. (Cl. 99—265)

This invention relates to apparatus for homogenizing liquids or plastic semi-liquids and the like.

Liquids, as is well known, are homogenized by forcing them under pressure through orifices or the like of small cross sectional area.

In the homogenizers heretofore proposed, it has been necessary to subject the liquid to enormous pressures to force the liquid through the homogenizing orifices; and the manufacture of the apparatus, particularly to provide the orifices, has resulted in great practical difficulties. Furthermore, the small orifices heretofore provided have been difficult to clean and keep sanitary particularly when milk, cream, ice cream mix and other edible materials are the liquids to be homogenized. Also, different liquids have required different pressures to force them through the homogenizing orifices and have flowed at different rates, so that for a given size of homogenizing orifice, a liquid requiring relatively low pressure to homogenize it properly can only pass through the homogenizing apparatus at a relatively low rate compared with the rate at which other liquids will go through it which can be homogenized at higher pressures.

It is therefore among the objects of this invention:

To provide a homogenizing apparatus in which the above stated objections and defects are obviated;

To provide generally an improved homogenizing apparatus;

To provide, in a homogenizing apparatus, an improved form of small cross-sectional area orifice and an improved method of making the same;

To provide a homogenizing apparatus constructed so that all of the parts thereof may be, conveniently, subjected to cleaning and disinfecting processes;

To provide a homogenizing apparatus having improved means to adjust the rate of flow therethrough in correspondence with changes of homogenizing pressure.

Another object is to provide a homogenizing device of simplified construction adapted to be installed in a conduit flow line through which liquid to be homogenized may be pumped.

Other objects will be apparent to those skilled in the art to which our invention appertains.

Our invention is fully disclosed in the following description taken in connection with the accompanying drawings, in which.

Figure 2:
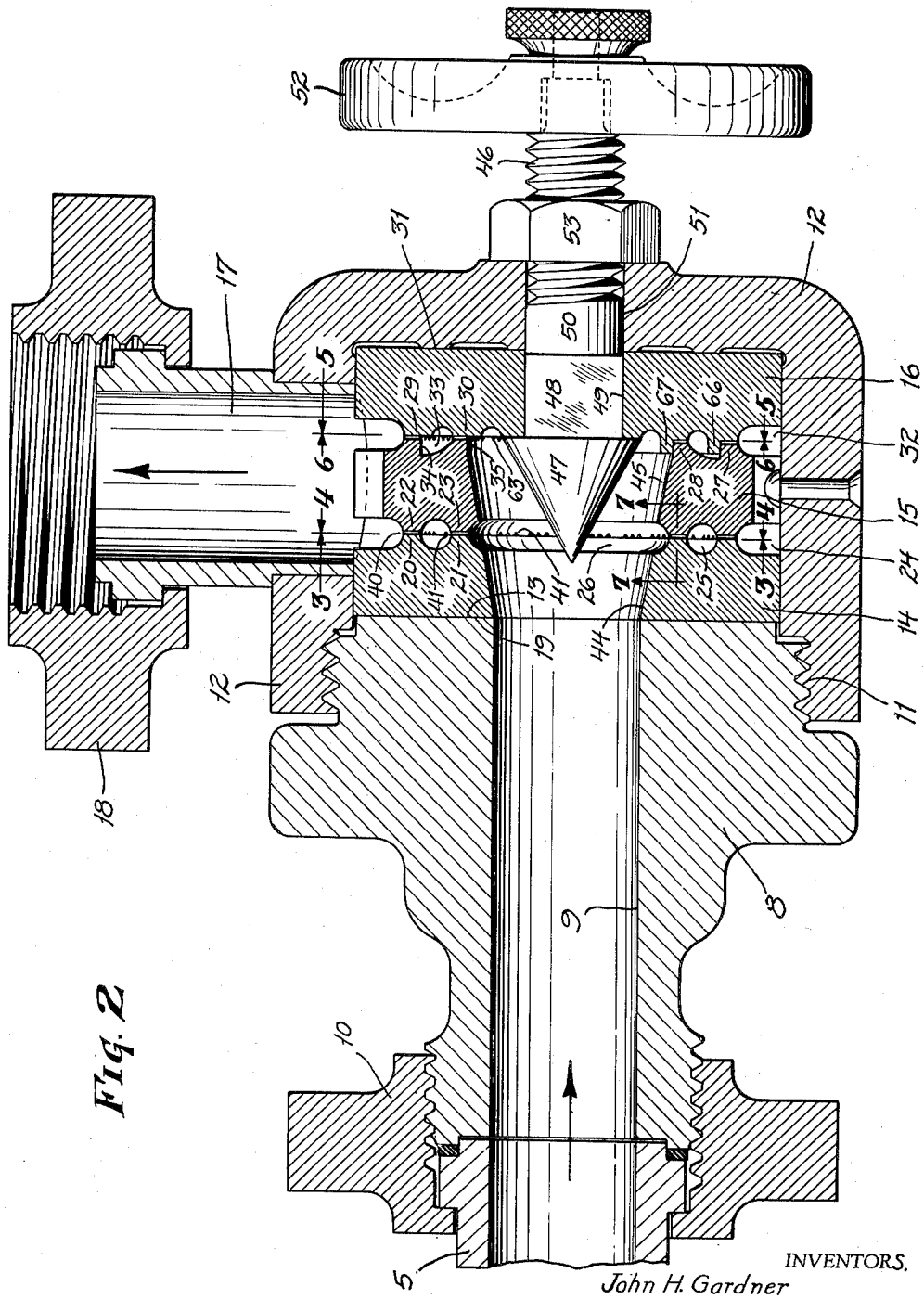
Fig. 2 is a longitudinal sectional view to an enlarged scale of a part of the apparatus illustrated in Fig. 1 in elevation and the plane on which the section is taken being indicated at 2—2 in Fig. 5.

Figs 3, 4, 5 and 6, respectively, are views taken from the planes 3—3, 4—4, 5—5 and 6—6 of Fig. 2;

Fig. 7 is a fragmentary view taken from the plane 7—7 of Fig. 2; and

Figs. 8 and 9 are views similar to Fig. 7 illustrating modifications.

Figure 1:
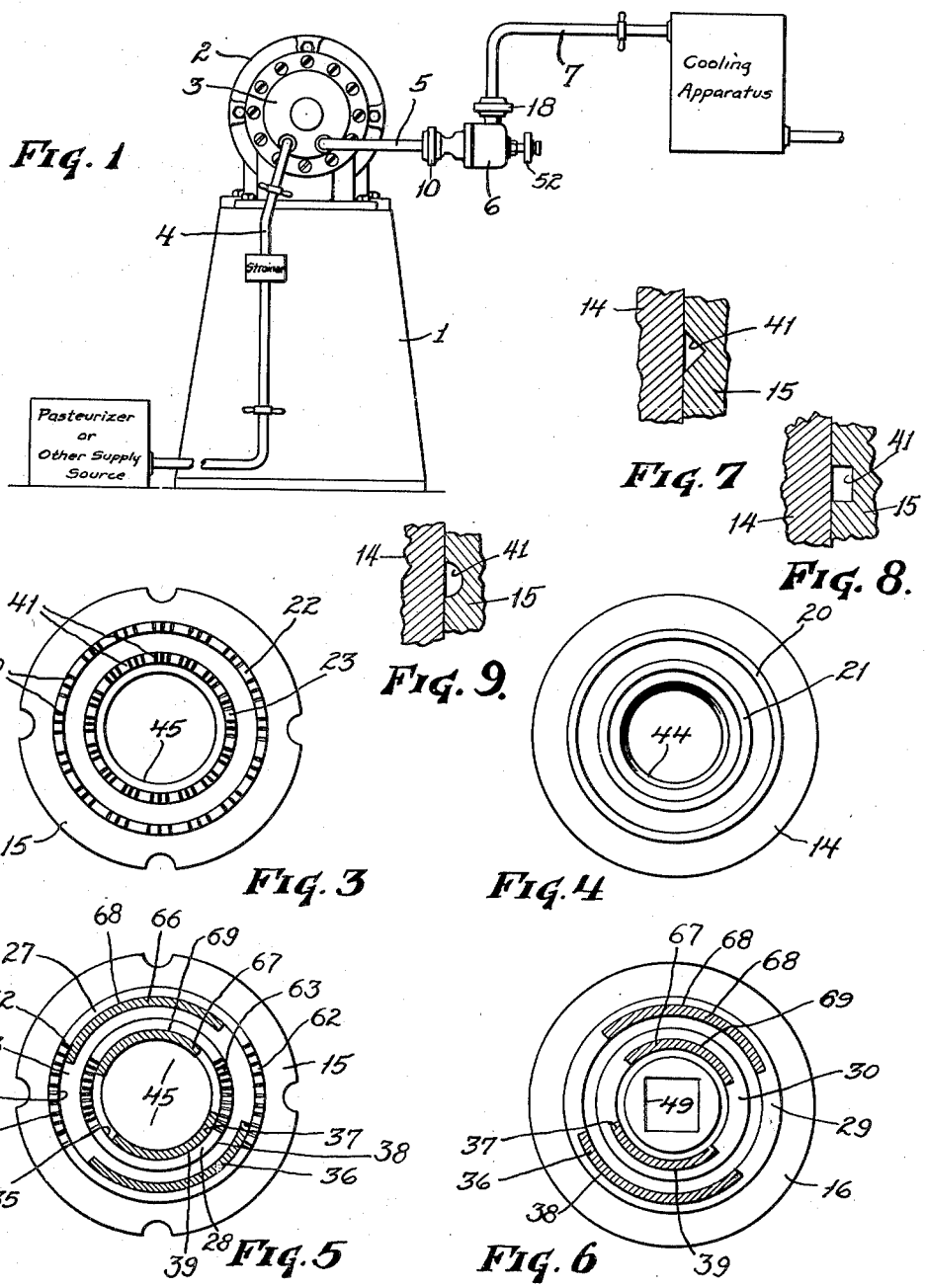
Fig. 1 is an elevational view, in some respects diagrammatic, of an apparatus embodying my invention and including in simplified showing, a pump for forcing liquid therethrough.

Referring to the drawings Fig. 1, we have shown at 1 a pedestal upon which is mounted a motor 2 and a pump 3, the pump having an inlet conduit 4 and an outlet conduit 5. Inlet conduit 4 is connected to a source of liquid supply which in the case of milk to be homogenized may be a pasteurizer as indicated.

The outlet conduit 5 communicates with a homogenizing device proper illustrated generally at 6 and liquid pumped therethrough in a manner to be described may be conducted by a conduit 7 to any suitable delivery apparatus which, in the case of homogenizing milk, may be a cooling apparatus as indicated.

Any suitable construction of pump 3 may be employed but we prefer to employ a positive displacement pump having the characteristic of uniform or non-undulating flow. Although the homogenizing device 6, to be more fully described, will operate with an undulating pressure, we have found that the operation thereof is improved and the homogenizing of liquids thereby is more uniform if the pressure is non-fluctuating.

The homogenizing device proper, 6, illustrated separately in Figs. 2 to 7 inclusive, Fig. 7 being to a slightly enlarged scale for greater clearness, is preferably made in unitary form and comprises a housing member 8 having a flow conduit passageway 9 extending longitudinally therethrough, and at one end of the passageway having threaded thereon a coupling element 10 by which it may be coupled to the outlet conduit 5. At the opposite end of the housing member 8, it has a threaded portion 11 upon which is threaded a generally cup-form housing member 12; and between the bottom of the cup-form member and the end 13 of the housing member 8, are clamped three disc-like elements 14, 15 and 16 super-posed one on the other and constructed in a manner to be described.

At one side of the cup-form housing member 12 it has, communicating with its interior, a conduit 17 having thereon a coupling element 18 adapted to threadedly engage the conduit 7.

The disc element 14 has a planar face 19 engaging the planar end 13 of the housing member 8 and the opposite face thereof has a pair of concentric elevated annular co-planar surfaces 20 and 21 in mutual engagement with a pair of like surfaces 22 and 23 on the intermediate disc 15; the annular surfaces being disposed to provide outwardly radially thereof an annular outwardly open groove 24 and between the engaged surfaces an annular chamber 25 and inwardly radially an inwardly open groove 26.

The disc 15 has on its opposite face a pair of concentric annular elevated co-planar surfaces 27 and 28 mutually engaging a pair of concentric co-planar elevated annular surfaces 29 and 30 on the disc 16, the opposite side of the disc as at 31 engaging the inner wall of the cup bottom of the housing member 12.

The surfaces 27, 28, 29 and 30 are so disposed as to provide radially outwardly thereof an annular chamber 32, and intermediate thereof an annular chamber 33.

The annular surfaces 30 and 29 are of greater inwardly radial extent than the surfaces 27 and 28 engaged therewith and the radially inner side walls 34 and 35 of the material supporting the surfaces 27 and 28 are formed cylindrical; and on the disc 16 are provided diametrically opposite pairs of upstanding segmental walls 36—36 and 37—37 having radially outward cylindrical portions 38—38 and 39—39 engageable with the cylindrical surfaces 34 and 35 respectively and rotatable relative thereto upon rotation of the disc 16 in a manner to be described.

The above described annular surfaces 22 and 23 have formed therein radially extending grooves 40—40 and 41—41 respectively of small cross-sectional area and the above described annular surfaces 27 and 28 of the disc have formed therein respectively on two diametrically opposite segmental portions of the annular surface a plurality of similar groups of grooves 42—42 and 43—43; the arrangement of the grooves 42—42 and 43—43 and the disposition thereof being such that the upstanding annular segmental portions 36—36 and 37—37 may, upon rotation of the disc 16, overlap the cylindrical surfaces 34 and 35 and thereby cover and close or uncover and open the radially inner ends of the grooves 42—42 and 43—43 so that all of said grooves may be uncovered or any number up to all of them covered and closed.

It will be noted that the upstanding segmental portion 36 controls the grooves 62; 66 controls the grooves 42; 37, the grooves 63; and 67 the grooves 43.

The disc 14 has a large central perforation 44 substantially registering with the end of the passageway 9; and the disc 15 has a similar large central perforation 45 substantially axially aligned with the perforation 44; the walls of the perforations 44 and 45 inclining outwardly away from the end of the passageway 9 in generally frusto-conical form as plainly shown in the drawings.

A bolt 46 having a head 47 disposed in the aligned perforations 44 and 45 has a square shank 48 thereof projected through a corresponding square hole 49 in the disc 16 and a circular shank portion 50 projected through a perforation 51 in the cup bottom of the housing portion 12 and outwardly thereof has rigidly secured thereto a handle 52. A nut 53 threaded on the shank 50 is adapted to draw the bolt head 47 upon the disc 16 to clamp it upon the cup bottom interior surface 31 to lock the disc against rotation after having been adjustably rotated by turning the handle 52.

The head of the bolt 47 is preferably of conical or conoidal form projecting into the perforations 45 and 44 to direct liquids flowing thereinto outwardly laterally.

From the foregoing description, it will be observed that the grooves 40—40 and 41—41 are covered by the annular surfaces 20—21 and that the grooves 46—62 and 43—63 are covered respectively by the surfaces 29 and 30. The grooves thus, when the discs 14, 15 and 16 are in the above described assembled relation, provide passageways of exceedingly small cross-sections. The liquid is forced therethrough in a manner to be more fully described and is homogenized thereby. We have found that when the passageways formed by the covered grooves are square in cross section and are at from a size .004″ x .004″ to .014″ x .014″ and when they are approximately ¾″ long, a suitable homogenizing operation will be performed on the liquid; and while we may employ grooves of the rectangular cross setional shape shown in Fig. 8, we prefer to employ grooves of the triangular or semi-circular form as shown in Figs. 7 and 9 having an equivalent cross sectional area to that referred to because of the greater ease of making them and because of their open form and the facility of cleaning the same. It is to be understood however, that various cross sectional shapes of groove may be employed having the desired size.

In operation, liquid forced under pressure into and through the passageway 9 enters the chamber formed by the perforations 44 and 45 in the discs 14 and 15 and is forced out radially through the passageways formed by the grooves 41—41 into the chamber 25 where it suddenly expands at the radially outer ends of the passageways and its velocity is reduced. It is then, still under pressure, forced through the passageways formed by the grooves 40—40 and into the annular chamber 24 where it again suddenly expands. A two-stage homogenizing action is therefore performed on the liquid by forcing it through two successive orifices. Since the passageway 24 communicates with the outlet conduit 17, the homogenized liquid may flow outwardly therethrough.

If the liquid to be homogenized is, for example, milk, the passageways formed by the grooves 43—63 and 42—62 will, at this time, be entirely closed off by the upstanding annular portions 36 and 67 which close these passageways as above described. The flow thus being caused to all occurs through the passages 40 and 41, a pressure of, say, 500 lbs. per sq. in. may be attained on the liquid for a given speed of operation of the pump. If, however, it be desired to change over to the homogenization of, say cream, this pressure is too high—200 lbs. per sq. in. being found to be more desirable. Heretofore, in order to reduce the pressure of liquid supplied by the pump, it has been necessary to by-pass the pump with a flow-controlling valve, the liquid thereby being caused to flow to the homogenizer at a reduced rate. With milk, as above described, the flow rate may be at 200 gals. per hour in a device approximately as illustrated herein but cream at 200 lbs. per sq. in. pressure would only be delivered at the rate of, say 100 gals. per hour because of the necessary pump by-pass.

With the above described construction, however, cream may be caused to flow through the homogenizer and be homogenized at the desired flow rate in gallons per hour but also at the desired lower pressure by the following means: the hand wheel 52 is turned to move the upstanding portions 36—66 and 37—67 to uncover more or less of the passages formed by the grooves 42—62 and 43—63 so that some of the liquid now flows through the uncovered passages 43—63 into the annular chamber 33 and thence through the uncovered passages 42—62 into the annular chamber 32 and thence out at the conduit 17, this flow being in parallel with the flow above described.

Thus for an extreme variation of viscosity encountered in different liquids to be homogenized, the disc 16 which carries the upstanding passageway closing annular portions 36—66 and 37—67 may be turned to uncover the right number of passageways to attain the desired pressure without a corresponding change of flow rate and output.

As will be obvious, to clean the homogenizing passages, the three discs may be removed and taken apart one from the other, which operation converts the passageways into grooves which can, of course, be readily cleaned.

Certain of the subject matter of this application is also described in a co-pending application of John H. Gardner, Serial No. 60,844, filed January 25, 1936 for improvements in Liquid homogenizing and the like methods and apparatus, and subject matter illustrated and described herein but not claimed is claimed in said co-pending application.

Our invention is not limited to the exact details and construction illustrated and described. Changes and modifications may be made within the spirit of our invention and within the scope of the appended claims.

We claim:

1. In a homogenizing apparatus a casing having therein a pair of discs having mutually engaged co-axial circular annular surfaces, one of the said annular surfaces having radial grooves therein covered by the other annular surface and providing radial passages, one disc being adjustably rotatable relative to the other, an elevated sector-form bead on the ungrooved element arranged to overlap and cover or uncover successive orifices to adjustably vary the number of effective orifices upon rotation, and means to confinedly communicate liquid under pressure to the uncovered orifices to force liquid therethrough.

2. In a homogenizing apparatus, a casing having therein a plurality of discs arranged in a tier, each disc having thereon an annular elevated surface engaged with an annular elevated surface of the next adjacent disc, one of each of the pair of engaged surfaces having radial grooves therein covered by the other surface of the pair to provide a plurality of radially extending orifices, means to sealedly conduct fluid under pressure to the orifices to force it therethrough, the grooved annular surface of one disc having an ungrooved portion providing an incomplete annular series of orifices between it and the corresponding disc engaged therewith, the latter disc being rotatable relative thereto and having an axially extending bead thereon rotatable into position to cover one or more of the said orifices to adjustably vary the total number of orifices.

3. In a homogenizing apparatus, a pair of co-axial relatively rotatable discs having engaged portions formed to provide radially extending grooves therebetween, conduit means for communicating liquid under pressure to said groves whereby the liquid may be subjected to a homogenizing action by being forced through the grooves, and a shoulder on one of said discs effective to close some of the grooves to liquid flow by relative rotation of the discs.

4. In a homogenizing apparatus, a pair of relatively rotatable elements having slideably engaged surface portions formed to provide radially extending grooves therebetween, one of said elements having a generally circular bore therein and the radially inner groove ends communicating with said bore to provide a plurality of orifices, the other element having an arcuate projection formed thereon slideably engaging the bore walls, and means for locking said discs in a plurality of relatively rotated positions to close some of said orifices by said projection, and conduit means adapted to communicate liquid under pressure to said bore whereby the liquid may be subjected to a homogenizing action by being forced through the grooves.

5. In a homogenizing apparatus, a casing having a liquid inlet and a liquid outlet, a pair of discs within the casing having sealingly engaged surface portions, one of said discs having a central cavity communicating with the liquid inlet whereby liquid may be transmitted under pressure to said cavity, the disc surface portions being grooved at spaced points to provide a plurality of passages effecting communication between said cavity and the liquid outlet, means extending within the cavity and slideably engaging the cavity walls to selectively close said passages, and means accessible externally of the casing for actuating the slideable means.

J. H. GARDNER.
L. C. PLASTRIDGE.